Sept. 8, 1931.  R. E. YOUNG ET AL  1,822,637
CLOSING PLATE ASSEMBLY FOR STEERING GEAR HOUSINGS, ETC
Filed March 29, 1928
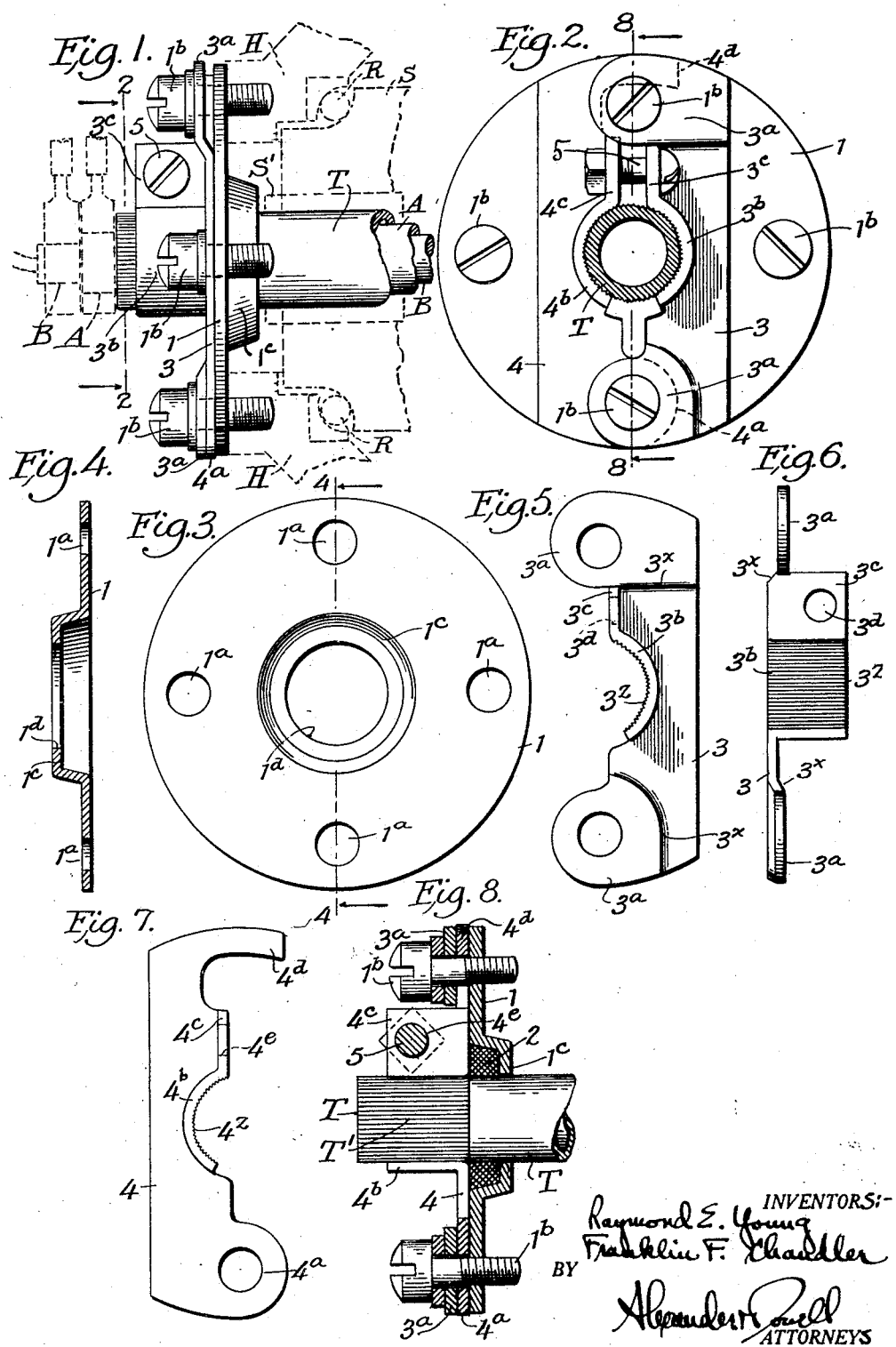
INVENTORS:-
Raymond E. Young
Franklin F. Chandler
BY
Alexander Powell
ATTORNEYS Patented Sept. 8, 1931

1,822,637

UNITED STATES PATENT OFFICE

RAYMOND E. YOUNG AND FRANKLIN F. CHANDLER, OF LA FAYETTE, INDIANA, ASSIGNORS TO ROSS GEAR & TOOL COMPANY, OF LA FAYETTE, INDIANA, A CORPORATION OF INDIANA

CLOSING PLATE ASSEMBLY FOR STEERING GEAR HOUSINGS, ETC.

Application filed March 29, 1928. Serial No. 265,701.

This invention is a novel closing plate assembly particularly adapted for closing the lower ends of steering gear housings and the like, where a fixed steering post tube usually carrying the nested spark and lever control tubes extends down through the lower end of the steering gear housing; and the principal object of the invention is to provide a lower closing plate assembly adapted to have an oil tight connection with the fixed tube which projects down through the lower end of the housing; also an assembly in which the fixed tube can be tightly clamped after being adjusted to proper position in the assembly and held against rotation or axial movement; also an assembly in which the fixed tube can be readily withdrawn without necessitating the removal of the base plate; and also to provide an inexpensive but efficient means for fixedly holding a tube in combination with a steering gear housing and at the same time making an oil tight and rigid connection between the tube and assembly.

Other minor objects of the invention will be hereinafter set forth.

We will explain the invention with reference to the accompanying drawings which illustrate one practical embodiment thereof to enable others familiar with the art to adopt and use the same; and will summarize in the claims, the novel features of construction, and novel combinations of parts, for which protection is desired.

As shown in the drawings;

Fig. 1 is a side elevation of our lower closing plate assembly showing diagrammatically in dotted lines the adjacent parts of the steering gear housing and the nest control tubes.

Fig. 2 is a section on the line 2—2, Fig. 1.

Fig. 3 is a plan view of the base plate of the assembly.

Fig. 4 is a section on the line 4—4, Fig. 3.

Fig. 5 is a plan view of the fixed clamping plate, detached.

Fig. 6 is a side elevation of the fixed clamping plate.

Fig. 7 is a plan view of the adjustable clamping plate, detached.

Fig. 8 is a section on the line 8—8, Fig. 2.

As shown in the drawings, the stationary steering post tube T, usually carrying the nested spark and throttle control tubes A and B, extends down through the lower open end of the steering gear housing H, the steering worm S being fixed on a tube S' which terminates within the housing H and is rotatable on the tube T, suitable ball races R being usually interposed between the end of worm S and the housing H, as diagrammatically indicated in Fig. 1.

The closing plate assembly for housing H preferably comprises a circular base plate 1 (Figs. 3 and 4) having diametrically opposed perforations 1a therein, evenly spaced on a pitch circle, through which tap screws 1b or the like pass to secure the plate 1 to the housing H and thereby close the opening in the lower end thereof.

Plate 1 has an axially disposed offset portion 1c which is preferably frustro-conical in shape and of diameter somewhat greater than that of tube T, the offset portion 1c extending rearwardly into the opening in the housing H. At the end of offset portion 1c is an axial opening 1d for the passage of tube T.

Within the frusto-conical offset portion 1c around the tube T is placed a gasket 2 (Fig. 8) for preventing lubricating oil from passing from the housing H downwardly along the tube T. Gasket 2 may be of any suitable material for forming an oil tight joint around the tube T, and preferably the outside diameter of the gasket is greater than the diameter at the smaller end of the conical portion 1c, and the washer is also preferably thicker than the depth of the conical portion 1c so that when the washer is confined as shown in Fig. 8 the same will be tightly compressed within the portion 1c around the tube T.

Mounted upon the outer face of plate 1 is a relatively fixed clamping plate 3 (Figs. 5 and 6) having perforated ears 3a for the reception of one set of diametrically opposed cap screws 1b whereby the plate 3 will be securely fastened to the base plate. The inner edge of plate 3 is provided with an arcuate flange 3b coaxial with the tube T but preferably of slightly less radius than that of the tube. One end of the arcuate flange 3b is continued as at 3c in a direction parallel with the axis through the perforations in ears 3a, no portion of the flanges 3b, 3c however extending to meet the axis through the perforations in said ears.

Ears 3a are preferably joggled outwardly as at 3x, from the plane of plate 3a, a distance equal to the thickness of the plate 3 for the purpose hereinafter set forth, the remaining portions of the plate 3 being adapted to bear flatly against the base plate 1. In the flange 3c is a perforation 3d.

Co-operating with the fixed clamping plate 3 is a similar but adjustable clamping plate 4 (Fig 7) having a perforated ear 4a at one end adapted to fit under the corresponding perforated ear 3a of plate 3 and to be pivoted on its respective cap screw 1b. Plate 4 has not offset portions corresponding with 3x of plate 3, but is provided with an arcuate flange 4b and a perforated flange 4c opposite to and symmetrically disposed with respect to flanges 3b and 3c when plate 4 is in normal position. The end of plate 4 opposite ear 4a is provided with an arcuate tongue 4d adapted to slide under the adjacent offset portion 3a of plate 3 above the cap screw 1b whereby the end of plate 4 may be swung towards or away from plate 3. A bolt 5 passes through a perforation 4e in flange 4c and the perforation 3d of flange 3c for drawing the plate 4 towards plate 3.

Plates 1, 3 and 4 are preferably stamped from sheet metal, and when assembled are preferably hinged about one of the set screws 1b; the tube T passing through the opening 1d in the frustro-conical portion 1c, through the washer 2 housed in the conical portion and between the opposed arcuate flanges 3b and 4b of plates 3 and 4 respectively; and by tightening bolt 5 the tube T may be securely clamped in position.

Preferably the inner faces of arcuate flanges 3b, 4b, are lined or serrated as at 3z, 4z and preferably accurately mated with corresponding lines or serrations T' on the tube to be clamped. The serrations T' of the tube and the arcuate portions 3z, 4z, of the plates 3 and 4 might not in practice be necessary as a sufficient clamping effect to hold the tube T rigidly might be secured even if these surfaces were smooth. However, the lining or serrating of the surfaces of the plates can be done while the same are being made, without additional cost; also the straight serrating T' of the tube is a very cheap operation and assists in holding the tube against rotation.

The clamping of the tube T is effected by tightening the bolt 5; and the whole assembly is solidly secured to the housing by tightening down cap screw 1b. If at any time the tube T must be removed bolt 5 and screws 1b can be loosened so that the clamping plates 3 and 4 may be separated and the tube can then be withdrawn. When the tube is removed in this way it is not necessary to remove the base plate 1 which can be held rigidly in its tight position by such screws 1b which do not engage the plates 3 and 4. The whole assembly provides a very cheap and efficient way of holding a tube or rod in combination with a steering gear housing or other housing and for making the connection oil-tight between the base plate and tube or rod.

We do not limit our invention to the exact form shown in the drawing for obviously changes may be made therein within the scope of the claims.

We claim:—

1. A lower closing plate assembly for housings having a tube extending therethrough comprising a base plate having a frusto-conical offset portion on its rear side having an opening therethrough for the tube; means on the outer side of the plate for clamping the tube; comprising movable plates mounted on the base adjacent the opening and having arcuate serrated flanges adapted to engage corresponding serrations on the tube, and means for drawing the plates together, and a gasket around the tube confined within the offset portion by the clamping means.

2. A lower closing plate assembly for housings having a tube or rod extending therethrough comprising a base plate having an opening for the passage of said tube; and relatively movable members mounted on the base adjacent the opening, each having an arcuate portion adapted in normal position to engage the tube or rod, the inner faces of the arcuate portions of the members being serrated, and means for drawing the movable plates together.

3. A lower closing plate assembly for housings having a tube or rod extending therefrom; comprising a base plate having an opening for the passage of the said tube or rod; a relatively fixed plate on the base beside the opening having an arcuate flange coaxial with the tube or rod; an adjustable plate beside the opening opposite the fixed plate having an opposed arcuate flange normally coaxial with the tube or rod; the inner faces of the flanges of the fixed and adjustable plates being serrated longitudinally of the tube or rod, and means for drawing the adjustable plate toward the fixed plate.

4. A lower closing plate assembly for housings having a tube or rod extending therefrom; comprising a base plate having an opening for the passage of the said tube or rod; a relatively fixed plate on the base beside the opening having an arcuate flange coaxial with the tube or rod; an adjustable plate beside the opening opposite the fixed plate having an opposed arcuate flange normally coaxial with the tube or rod, the fixed plate having joggled perforated ears bolted to the base plate; and the adjustable plate having a perforated ear pivotally underlying one ear of the fixed plate and having an arcuate tongue underlying the other ear of the fixed plate; and means for drawing the adjustable plate toward the fixed plate.

5. A lower closing plate assembly for steering gear housings having a steering post tube extending therethrough; comprising a base plate having a frustro-conical offset portion on its rear face having an axial opening therein for the passage of the tube; a relatively fixed plate secured to the front face of the base plate and closing substantially half of the area of the offset portion, and having an arcuate flange coaxial with the tube; an adjustable plate on the front face of the base plate normally closing substantially the other half of the area of the offset portion, and having an arcuate flange normally coaxial with the tube; means for drawing the adjustable plate towards the fixed plate, the inner faces of the flanges of the fixed and adjustable plates being serrated longitudinally of the tube to engage corresponding serrations on the tube; and a washer around the tube confined within the offset portion by the fixed and adjustable plates.

6. A lower closing plate assembly for steering gear housings having a steering post tube extending therethrough; comprising a base plate having a frustro-conical offset portion on its rear face having an axial opening therein for the passage of the tube; a relatively fixed plate secured to the front face of the base plate and closing substantially half of the area of the offset portion, and having an arcuate flange coaxial with the tube; an adjustable plate on the front face of the base plate normally closing substantially the other half of the area of the offset portion, and having an arcuate flange normally coaxial with the tube, the fixed plate having joggled perforated ears bolted to the base plate; the adjustable plate having a perforated ear pivotally underlying one ear of the fixed plate; and having an arcuate tongue underlying the other ear of the fixed plate; opposed perforated flanges on the fixed and adjustable plates forming continuations of the arcuate flanges; a bolt transfixing the perforated flanges for drawing the adjustable plate towards the fixed plate; and a washer around the tube confined within the offset portion by the fixed and adjustable plates.

RAYMOND E. YOUNG.
FRANKLIN F. CHANDLER.